June 9, 1931.  E. Z. COLE  1,809,620
NUT LOCK
Filed Feb. 7, 1929  2 Sheets-Sheet 1

Inventor
Elwyn Z. Cole
By

June 9, 1931.  E. Z. COLE  1,809,620
NUT LOCK
Filed Feb. 7, 1929   2 Sheets-Sheet 2
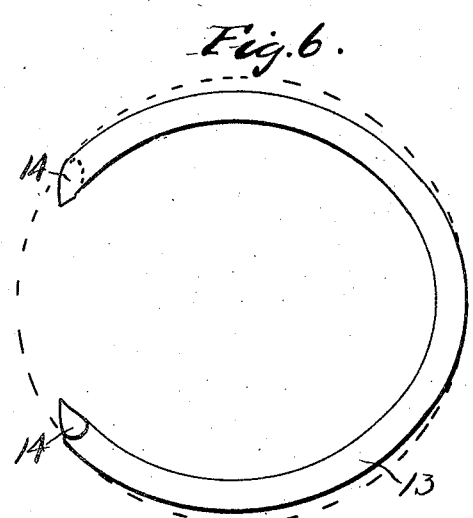
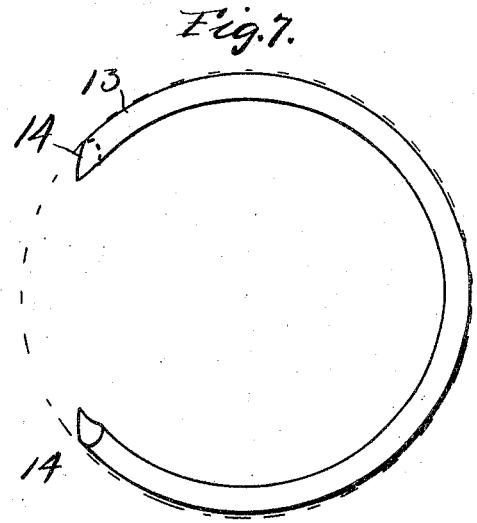
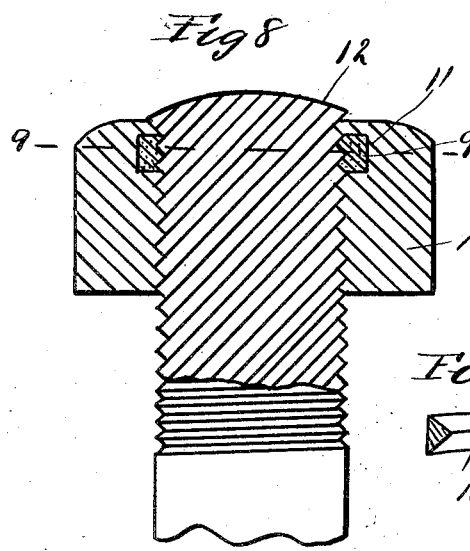
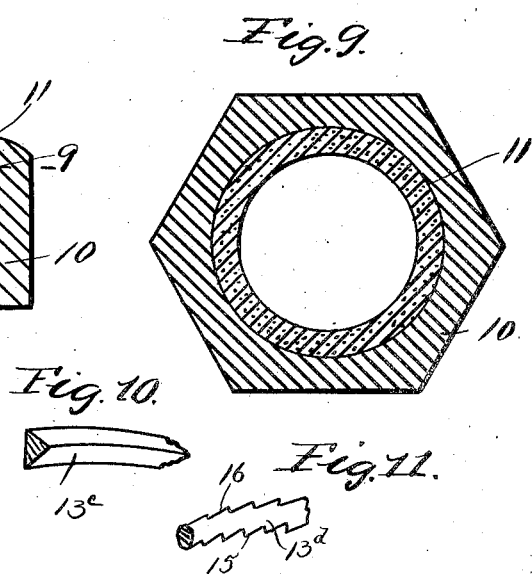
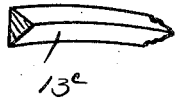
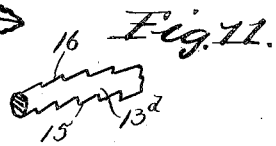
Inventor
Elwyn Z. Cole
By W. W. Williamson
Atty Patented June 9, 1931

1,809,620

UNITED STATES PATENT OFFICE

ELWYN Z. COLE, OF PHILADELPHIA, PENNSYLVANIA

NUT LOCK

Application filed February 7, 1929. Serial No. 338,096.

My invention relates to new and useful improvements in a nut lock and has for one of its objects to provide an exceedingly simple and effective device of this description which involves no change in the bolt upon which the nut is threaded only requiring that a small internal groove be formed in the nut and the insertion of a simple locking device in this groove.

A further object of the invention is to provide a locking device which will track with the threads of the bolt and so grip the same as to prevent the backing off of the nut instant to vibrations when in use.

A still further object of my invention is to so construct and proportion the strength of the locking member that the nut may be backed off when sufficient strain is exerted thereon by the use of a wrench, without marring the threads of the bolt or in any way impairing the nut or the locking member.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 6 is a diagram showing the washer illustrated in Fig. 3 illustrating the position the locking member assumes when inserted in the nut and before the bolt has been threaded therethrough.

Fig. 7 is a view similar to Fig. 6 showing the position and the form the locking member assumes after the bolt has been threaded therethrough.

Fig. 8 is a view similar to Fig. 2, the lower portion of the bolt being broken away and illustrating a modified form of my invention.

Fig. 9 is a section at the line 9—9 of Fig. 8.

Fig. 10 is a detail perspective of a portion of the locking member of another form of my invention.

Fig. 11 is a view similar to Fig. 10, showing a further modified form of the locking member.

In carrying out my invention as herein embodied, 10 represents a nut having an internal annular groove 11 formed therein and this nut is adapted to be threaded upon a bolt 12 of usual construction.

13 represents a locking member consisting of a split ring round in cross section and of resilient material adapted to be seated in the groove 11 and having its ends beveled in opposite directions, as indicated at 14 so as to readily enter the threads of the bolt when the latter are run into the nut so as to cause the ring to track in said threads, as will be readily understood.

The ring is of such shape that when sprung into the groove in the nut it will bear at three points upon the rear wall of said groove, as clearly shown in Fig. 6, so that when the bolt is threaded in the nut and passes within the ring, the ring will be expanded and assume the form and position shown in Fig. 7, thereby tightly gripping the threads of the bolt and being forced into firm contact with the inner wall of the groove.

This arrangement will so hold the nut upon the bolt as to absorb the vibrations instant to the use to which such nuts are put and effectually prevent the backing off the nut in practice, but when it is desired to back off the nut, a wrench of sufficient size to give proper leverage is applied to the nut and enough force exerted upon said wrench to overcome the grip of the locking member upon the bolt.

It will be seen that the threads of the bolt will not be marred by the backing off of the nut nor will the locking member or nut be in any way impaired and therefore, the nut may be backed off and replaced time and again and may also be set up to compensate the wear as often as it is necessary.

Figure 1:
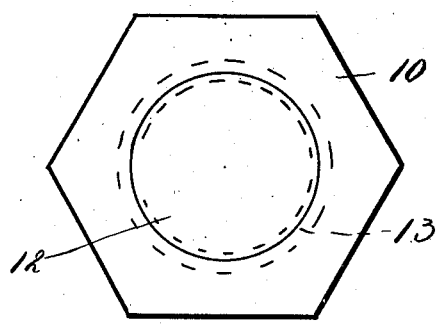
Fig. 1 is a plan view of the nut made in accordance with my improvement.
Figure 3:
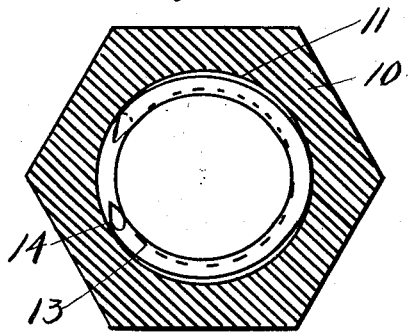
Fig. 3 is a section at the line 3—3 of Fig. 2.
Figure 2:
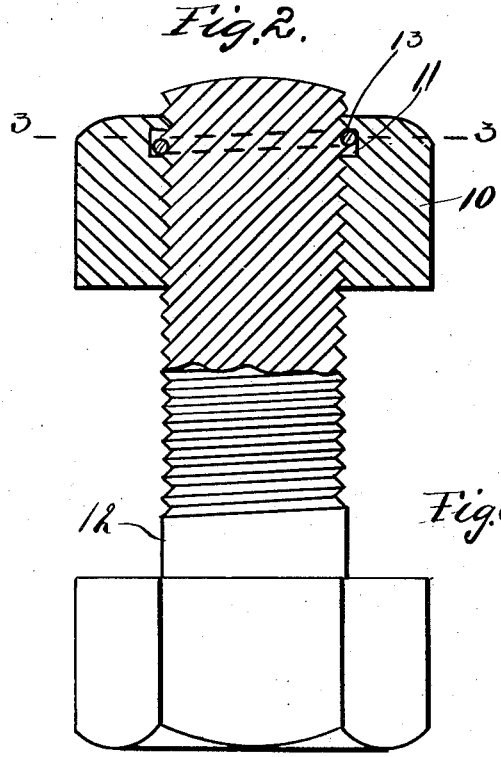
Fig. 2 is an elevation of a bolt partly sectioned away and showing my improved nut lock threaded thereon.
Figure 4:
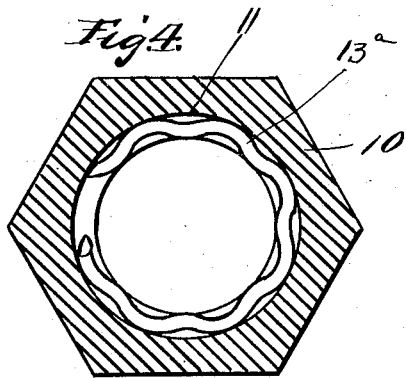
Fig. 4 is a view similar to Fig. 3 showing a modified form of locking member.

I have found that by the use of a locking member 13$^a$ such as shown in Fig. 4, wherein the ring is corrugated so as to form multiple spring sections adapted to bear against the threads of the bolt and the inner wall of the groove, an effective grip is had upon the bolt and for some purposes this form of locking member is desirable.

Figure 5:
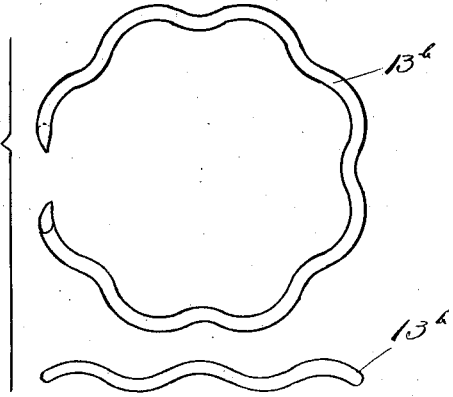
Fig. 5 is an enlarged detail plan and edge view of a further modified form of the locking member.

I have also found that by corrugating the locking member 13$^b$ in two directions, as shown in Fig. 5, a further grip is had upon the threads of the bolt and also upon the rear wall of the groove, as well as upon the side walls of the latter.

When found desirable, the locking member 13$^c$ may be made in the form shown in Fig. 10 in which it is V-shaped in cross section after the manner of a chisel point.

Should it be desired to further increase the grip of the locking member upon the threads of the bolt, the form shown in Fig. 11 may be used in which the locking member 13$^d$ has a series of teeth 15 formed upon one side thereof for engagement with these threads, while its opposite side has formed thereon the teeth 16 for engagement with the rear wall of the groove, and as will be readily seen these teeth will tend to dig into both the threads of the bolt and the rear wall of the groove, thereby effecting a more definite hold and overcoming to a greater degree the tendency of the nut to back off, yet when the nut is backed off by the use of a wrench, these teeth will not materially mar the threads as said teeth are intended to be properly proportioned for this result.

It is to be noted that the locking members 13, 13$^a$ and 13$^b$ are reversible within the groove and require no special attention in assembling.

The form of my invention shown in Figs. 8 and 9 is especially adapted for certain classes of work and consists in the insertion in the groove 11 of a resilient compressible material, such as semi-hard rubber, fibre or the like, so that when the bolt is threaded through this material, the latter will be crowded into the threads and produce considerable friction after the manner of the action of wood upon a screw threaded therein, and if desired, this locking member may be of a composition carrying a sealing material, such as red lead or plumber's paste which will "set" upon the threads of the bolt and upon the walls of the groove and rigidly hold the nut against being backed off; yet when sufficient pressure is applied to the nut by a wrench, this seal may be broken and the nut backed off; and I have found that by using rubber having the proper amount of sand therein, a very effective grip is had upon the bolt.

Of course I do not wish to be limited to the exact details of construction as herein shown, as these may be varied within the limits of the appended claims without departing from the spirit of my invention.

Having thus fully described my invention, what I claim as new and useful is:—

A locking nut comprising a nut having an internally threaded bore for coacting with a threaded bolt, said nut also having an annular groove around the bore; and a split spring metal ring fitted in said groove so as to track in the threads of said bolt and exert spring pressure upon the outer wall of the groove and upon the threads in which it is tracking, said ring having its ends bevelled in opposite directions to facilitate entrance in said threads.

In testimony whereof, I have hereunto affixed my signature.

ELWYN Z. COLE.